United States Patent [19]

Simms et al.

[11] Patent Number: 5,017,354

[45] Date of Patent: May 21, 1991

[54] PROCESS FOR PRODUCTION OF HIGH PURITY SILICA GEL

[75] Inventors: Barbara L. Simms, North White Plains; Chihang R. Chu, Yonkers, both of N.Y.

[73] Assignee: Akzo America Inc., New York, N.Y.

[21] Appl. No.: 240,014

[22] Filed: Sep. 2, 1988

[51] Int. Cl.$^5$ .............................................. C01B 33/12
[52] U.S. Cl. ...................................................... 423/338
[58] Field of Search ......................... 423/338; 422/209

[56] References Cited

U.S. PATENT DOCUMENTS

| | | | |
|---|---|---|---|
| 2,559,441 | 7/1951 | Judd | 422/209 |
| 4,148,864 | 4/1979 | Groth et al. | 423/338 |
| 4,353,874 | 10/1982 | Keller et al. | 422/209 |
| 4,680,049 | 7/1987 | Su et al. | 65/18.1 |

FOREIGN PATENT DOCUMENTS

| | | | |
|---|---|---|---|
| 3500080 | 7/1986 | Fed. Rep. of Germany . | |
| 58-181735 | 10/1983 | Japan | 423/338 |
| 60-239329 | 11/1985 | Japan . | |
| 62-59515 | 3/1987 | Japan . | |
| 62-91428 | 4/1987 | Japan . | |

OTHER PUBLICATIONS

Tsuyama et al, "Chem. Abstr.", 108, 58828r.
Klein et al, "ACS Symp. Series 194", Chapter 18, pp. 293–304 (1982).
Gossink et al., "Mat. Res. Bull.", vol. 10, pp. 35–40 (1975).
Su et al., "Mat. Res. Soc. Sym. Proc.", vol. 73, pp. 237–244 (1966).

*Primary Examiner*—Jack Cooper
*Attorney, Agent, or Firm*—Richard P. Fennelly; Louis A. Morris

[57] ABSTRACT

High purity, particulate silica gel is formed by the hydrolysis and condensation of a silicon alkoxide in a non-metal lined tumble dryer. The silica gel is then dried in the tumble dryer, is washed with an aqueous solution to remove trace contaminants, and is dried again to form the particulate product.

6 Claims, 2 Drawing Sheets

PROCESS FOR PRODUCTION OF HIGH PURITY SILICA GEL

BACKGROUND OF THE INVENTION

1. Field of the Invention

The present invention relates to a process for making high purity, particulate silica gel from a silicon alkoxide starting material.

2. Description of the Prior Art

In general, there are two ways in which silica gel can be manufactured.

The first starts with a naturally occurring inorganic silica source, such as sodium silicate, which is treated with acid in water to precipitate silica as well as certain impurities, e.g., sodium cation, and the anion of the acid. In general, a washing procedure would be used in order to remove such contaminants from the silica gel product. In a recent reference (Chem. Abstr. 108:58828) another procedure was described in which a silica source was dissolved in a mixture of hydrofluoric acid and sulfuric acid, distilled, and the distillate, comprising water and silicon fluoride, was mixed with aqueous ammonia to form silica gel which was filtered, washed with water, dried and then fired to give high purity silica.

An alternative way of forming silica gel relies upon the use of a silicon alkoxide (or organic-containing) starting material. Such a material, if acidified with aqueous acid, forms a gel upon ageing. Treatment of the acidified solution with a base, such as ammonium hydroxide, accelerates formation of the gel, a product which theoretically can have a much higher purity level than silica gel formed from the naturally occurring inorganic sodium silicates, for example. A general article describing such an approach, which does not specifically address how a high purity, particulate product might be obtained, is "Silicon Alkoxides in Glass Technology" by L. C. Klein et al., ACS Symp. Series 194, Chapter 18, pp. 293-304 (1982). In Japanese Patent Publication No. 60/239,329 a sol-gel process for forming high purity silica monoliths (rather than powders) is described in which powdered silica is added with the alkoxide during the hydrolysis step, which is followed by a centrifuging step to remove large silica particles. The slurry is then gelled, and is washed and dried. It appears that the procedure is a bench scale experiment that involves transfer of product between various reaction vessels. In general, persons of ordinary skill in the art who use silicon alkoxides in a sol-gel synthesis route deem that certain precautions are essential if a high purity silica gel is to be formed. The synthesis is, for example, carried out under clean room conditions using either quartz glass or plastic apparatus with highly pure reagents. The use of special quartz glass or plastic in the reactor vessels and related equipment is deemed essential in precluding the presence of trace levels of contaminants such as alkaline metal cations, metallic cations, and the like. For example, R. G. Gossink et al. in Mat. Res. Bull., Vol. 10, pp 35-40 (1975) indicate use of quartz glass and TEFLON fluoropolymer in the apparatus used for hydrolysis of ethyl silicate in a laminar flow box under clean room conditions. Japanese patent publication No. 62/91,428 also mentions use of clean room conditions in conjunction with the sol-gel method to form glass which is apparently in the form of a monolith rather than being in particulate form. Unfortunately, the use of such clean room conditions and specialized equipment can render the synthesis procedure prohibitively expensive. Although it may be possible to use such conditions and specialized equipment for lab scale preparations, the economic cost for using such conditions and equipment largely precludes the scale-up of the procedure to either pilot plant or plant scale.

Japanese Patent Publication No. 62/59,515 indicates hydrolysis of tetramethoxysilane in the presence of membrane filter-purified carbon dioxide in either a stainless steel or glass reactor which does not contaminate the product with any impurities from the reactor.

German Patent Publication No. 3,500,080 avoids hydrolysis of tetraethoxysilane in the production of high purity silica, choosing instead its oxidation in an inert gas stream (e.g., $N_2$) in a cold plasma which contains oxygen.

Su et al., in Mat. Res. Soc. Symp. Proc., Vol. 73, pp. 237-244 (1986) and in U.S. Pat. No. 4,680,049 describes the synthesis of high purity silica glass (in monolithic form, rather than particulate form) from the metal alkoxide and utilize supercritical drying of the gel produced in their process.

SUMMARY OF THE PRESENT INVENTION

The present invention involves the preparation of essentially pure, particulate silica gel which is substantially free of trace contaminants by first forming a silica gel composition, by the hydrolysis and condensation of a silicon alkoxide, in a non-metal lined tumble dryer, by then drying the thus formed silica gel in the tumble dryer, by washing the dried, particulate silica gel composition thus formed with an aqueous washing solution to remove trace contaminants therefrom, and by finally drying the washed silica gel powder in the tumble dryer.

The instant process conducts the silica gel formation, drying, washing and final drying steps in the same piece of equipment (i.e., a tumble dryer) thereby minimizing the transfer of materials between different process equipment to reduce the likelihood of contamination (e.g., by metallic cations). The tumble dryer equipment used in the instant process, as will be described in greater detail below, is neither quartz glass-lined nor completely plastic-lined (e.g., with TEFLON fluoropolymer). Therefore, it is significantly less costly than some of the very specialized bench scale equipment taught for use in the prior art. This makes the instant process much more economical on the larger scale that it is practiced. Also, the instant process is capable of being practiced under ordinary laboratory or plant conditions where the environment need not be as regulated to quite the stringent requirements of some of the "clean room" conditions required by the prior art. In summary, the instant process is an economical procedure of good scale which produces a very pure, particulate silica gel product.

DESCRIPTION OF THE DRAWINGS

The instant process is further understood by reference to the Drawings, which form a portion of the instant specification wherein.

DETAILED DESCRIPTION OF THE PRESENT INVENTION

Figure 1:
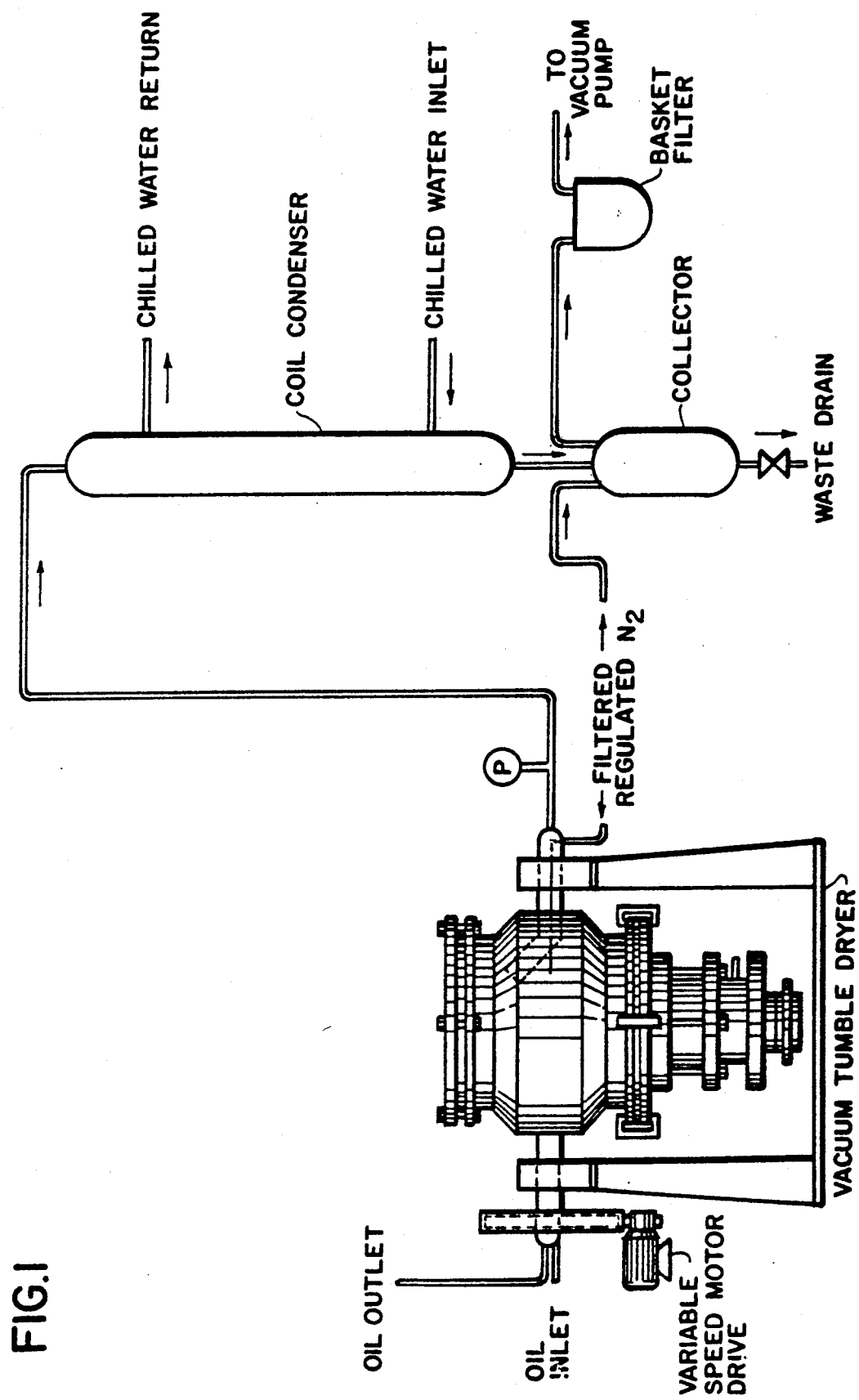
FIG. 1 is a flow diagram illustrating a pilot plant design utilizing the instant process.
Figure 2:
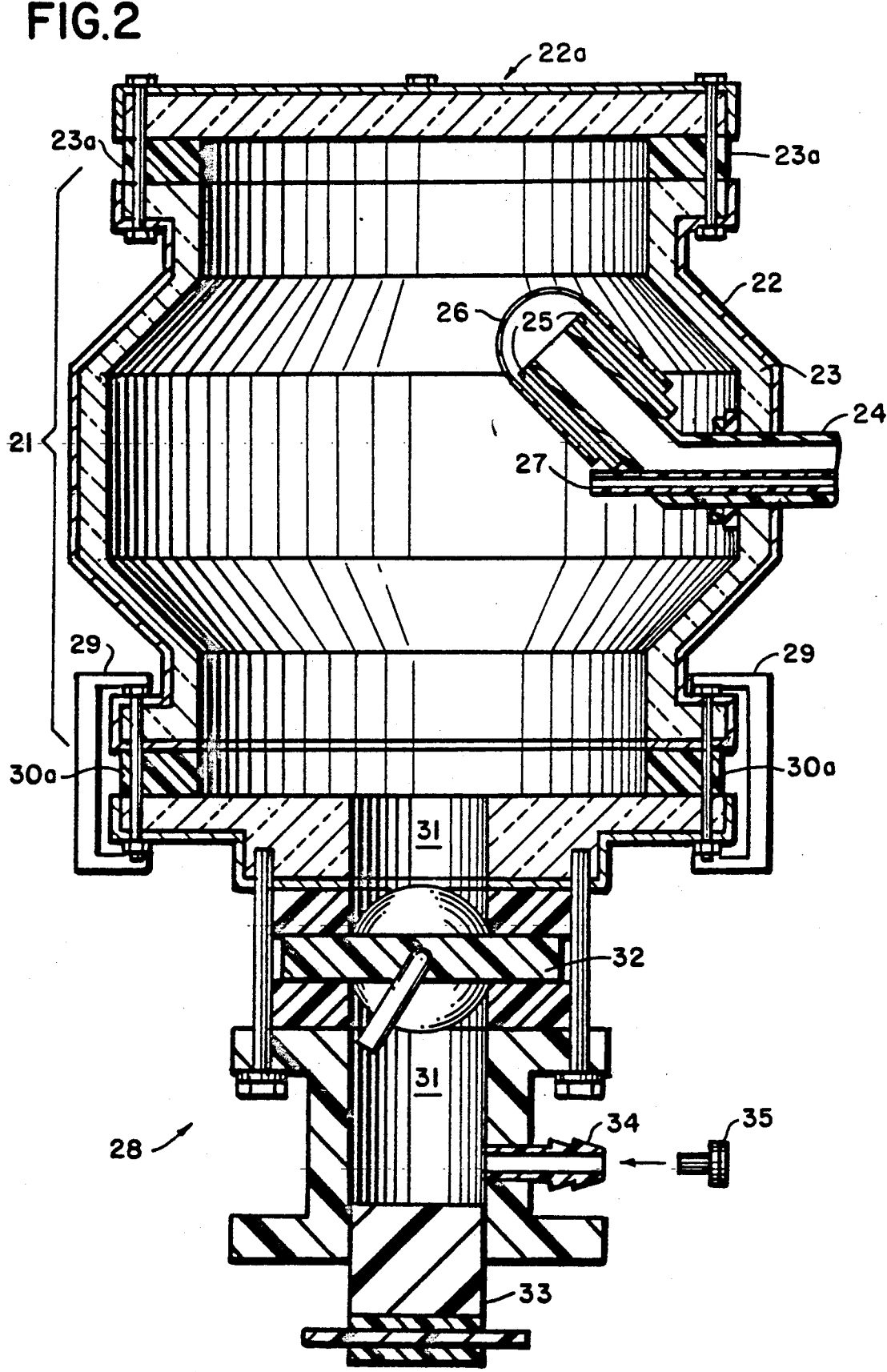
FIG. 2 is a cross-sectional view of a tumble dryer, adapted to be encased within a heat transferring jacket, for use in the instant process.

The process steps utilized in forming the silica product of the instant invention are conducted in a tumble dryer which is a known piece of chemical process equipment. As indicated, for example, in Industrial Drying, A. Williams-Gardner (Gulf Publishing Company, Houston, Texas, 1977) on pages 249-253, this type of equipment is a double-cone vacuum dryer where the steep slope of the cone allows for rapid discharging of product on completion of drying. Preferred tumble dryers are available from Pfaudler Co. and are non-metal lined to insure that the product treated therein does not pick up the cation contamination that would normally be likely if a metal-lined tumble dryer was used. Preferably, this dryer is modified, as shown in FIGS. 1 and 2, and as described in further detail below. The internal surfaces of the preferred tumble dryer from Pfaudler Co. are coated with an engineering laminate formed by spraying a slurry of powdered glass onto a base of mild steel followed by high-temperature firing. Other portions of the tumble dryer, as modified, are formed of materials (e.g., TEFLON fluoropolymer) which also do not give rise to contamination from a metal surface.

FIG. 2 illustrates the modified tumble dryer of the present invention in greater detail. The central body section 21 is directly derived from the commercially available tumble dryer and has an outer metal surface 22 and a glass coating 23 on the inner surface thereof which will eventually contact the reactants and product of the present process. The commercially available dryer has been modified at three principal locations as will now be described.

One end of the central body section 21 is closed off by a glass lined-metal blind flange 22a. Gasket 23a formed of TEFLON fluoropolymer resides between the flange 22a and the body section 2i.

The inlet apparatus for the modified tumble dryer comprises a fluoropolymer coated vacuum tube 24, a fluoropolymer insert tube 25, and a fluoropolymer filter bag 26. A nitrogen purge tube 27, also formed of fluoropolymer is also provided to allow for loading of reactants and for purging of the dryer.

The other end of the dryer has an extraction mechanism 28 for removal of product from the dryer. This mechanism is secured to the dryer body 21 by C clamps 29 with interposed fluoropolymer gasket 30a. This mechanism comprises a central conduit 31 leading from the exterior of the mechanism to the interior of body 21, a fluoropolymer butterfly valve 32 in the conduit, and a fluoropolymer plug/handle component 38 closing off the exterior end of conduit 31. A hose fitting 34 which can be closed off by plug 35 is provided for optional liquid loading.

As indicated before, the above-described tumble dryer is used during the chemical reaction step in which the silicon alkoxide (also termed "alkyl silicate") is hydrolyzed and condensed to form a crude silica gel product. The chemistry relating to this operation is well known to persons of ordinary skill in the art and is described in connection with ethyl silicate in the Klein et al. reference and in regard to use of metal silicate in the Onorato et al. patent, both of which have been mentioned above. Applicants prefer to use an ethyl silicate reagent.

The various reactants and other reaction reagents are added to the dryer via fluoropolymer tubes from dedicated containers to avoid cross-contamination. A filter is used to remove any particulates and a filter cartridge is used to remove unwanted water.

The applicants' process involves the initial addition of ethanol to the tumble dryer to act as a mutual solvent for the reaction. Ethyl silicate and water are immiscible in each other, but a single reaction phase is formed when the ethanol is additionally present.

Water and nitric acid, a catalyst for the hydrolysis of the ethyl silicate, are then added. Both the water and nitric acid are purified over the levels normally used in chemical synthesis. The water is preferably a high purity deionized water whereas the acid is of a relatively high degree of purity, although the much more expensive ultra-pure grades need not be used. The idealized hYdrolysis step has the following equation:

$$Si(OEt)_4 + 4H_2O \rightarrow Si(OH)_4 + 4EtOH$$

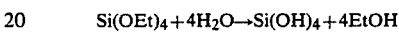

The resulting reaction mixture is suitably agitated in the non-metal lined tumble dryer.

After a suitable period of time, the nonviscous, homogeneous starting material becomes a sol or hydrolyzed polymer solution. At this point, a mixture of water and ammonia solution is added to aid in promotion of the condensation reaction, idealized in the equation below, for which ammonia is a catalyst:

$$Si(OH)_4 \rightarrow SiO_2 + 2H_2O$$

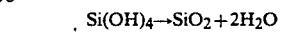

The condensation turns the sol into a gel. The ammonia also increases the pH of the reaction mixture. Ammonia added in a stoichiometric amount relative to the acid catalyst neutralizes the reaction mixture. More ammonia than acid catalyst renders the reaction mixture basic (e.g., up to about 30% excess based on amount of catalyst). When added in excess, the ammonia results in a silica gel having lower surface area and larger pores which allow more effective escape of entrapped organic residue.

As the condensation proceeds and heat is applied to the dryer, alcohol becomes extracted so that the gel forms a slurry. The temperature of any heating medium used any heating jacket encasing the tumble dryer body show in FIG. 2 can range, for example, from about 90° C. to about 110° C. Later product morphology changes to a chunk-containing character and then to a granular crude silica product as the tumble dryer agitates the product breaking down chunks of silica gel into a more granular product. This unwashed product may have a yellowish tint due to the presence of organic residue in the gel.

The crude silica gel, after the initial reaction and drying step that occurs as by-product ethanol is removed, is then washed with water and then with aqueous hydrogen peroxide while being tumbled in the tumble dryer. Since the silica is insoluble in water, a slurry is formed during this washing operation. Water is then decanted off and the water soaked, particulate gel is dried under vacuum. The washing removes neutralization products formed during the conversion of the silicon alkoxide to silica gel (e.g., ammonium nitrate from the reaction of nitric acid and ammonia), any soluble metal salts from the reagents which are used (e.g., ferric nitrate), and any organic residues resulting from use of the alkyl silicate starting material.

The instant invention is further illustrated by the Examples which follow.

EXAMPLES 1-5

General Procedure

Ethanol (4 gallons, 200 proof) was charged into a Pfaudler tumble dryer (Model 24-45 CD-SB) coated with GLASTEEL engineering laminate formed by spraying a slurry of powdered glass onto a base of mild steel followed by firing. High purity filtered deionized water (1.25 gallons), having a resistivity of about 18 mego-ohm/cm at 25° C. and obtained using a Barnstead NANOPURE II filtration system, containing 25 milliliters of concentrated (70.5%) nitric acid (BAKER INSTRA-ANALYZED brand) was then added followed by 4 gallons of tetraethylorthosilicate (SILBOND CONDENSED brand from Akzo Chemicals Inc.). The resulting mixture was mixed at 20 rpm for 60 minutes at atmospheric pressure and room temperature. To this mixture was then added 1.25 gallons of high purity deionized water containing 35 milliliters of ammonia solution (21.5%) from BAKER INSTRA-ANALYZED ammonium hydroxide reagent.

The above mixture was then mixed at 20 rpm at atmospheric pressure at about 90°-110° C. for 11 hours. Ethanol (which contained Water) Was recovered in an overhead condenser during this gel formation step.

A product washing step was then carried out by first charging 2 gallons of water to the gel and mixing the admixture at 20 rpm for 1 hour at 60° C. After 1 hour, the water was decanted, and 2 gallons of fresh water containing 3% hydrogen peroxide was charged to the tumble dryer. The dryer contents were then mixed for 30 minutes at 60° C. After 30 minutes, the water from this third wash was decanted.

The dryer was then heated for 5 hours at 135° C. during a final drying step during which the tumbler was rotated at 20 rpm. The batch was cooled to 50° C., and the product silica was then discharged.

The following data was obtained on five runs (Examples 1-5).

|  |  | 1 | 2 | 3 | 4 | 5 |
|---|---|---|---|---|---|---|
| Product Collected, lbs. | | 6.8 | 7.7 | 8.1 | 8.0 | 7.2 |
| Particle Size Distributions: Cumulative Wt. % on: | | | | | | |
| 10 mesh | (>2000 Microns) | 0 | 1 | 0 | 0 | 0 |
| 20 mesh | (840 Microns) | 14 | 31 | 4 | 8 | 2 |
| 40 mesh | (420 Microns) | 49 | 64 | 40 | 36 | 10 |
| 60 mesh | (250 Microns) | 70 | 77 | 64 | 58 | 32 |
| 80 mesh | (177 Microns) | 76 | 82 | 75 | 69 | 48 |
| 100 mesh | (149 Microns) | 79 | 85 | 80 | 74 | 56 |
| 140 mesh | (105 Microns) | 82 | 89 | 86 | 80 | 68 |
| 200 mesh | (74 Microns) | 84 | 91 | 91 | 85 | 79 |
| 325 mesh | (44 Microns) | 88 | 95 | 97 | 91 | 90 |
| −325 mesh | (<44 Microns) | 100 | 100 | 100 | 100 | 100 |
| Appearance of Product | | Very White | Very White | Very White | Very White | Very White |
| Appearance of Product after calcination | | White | White | Carbon Partc. | Some Carbon Partc. | White |

A composite sample from Run Nos. 1-3, above, had the following trace metal analysis by atomic emission with direct coupling plasma:

| Trace Metal | Amount (ppm) |
|---|---|
| Na | 0.09 |
| Fe | 0.44 |
| Ni | 0.45 |
| Al | 0.075 |
| Ca | 0.11 |
| Ti | 0.055 |

EXAMPLE 6

The same general procedure used in Examples 1-5 was employed with certain changes:

1. The ammonium hydroxide solution comprised 4.732 liters of water and 0.025 liter of 29.5% $NH_4OH$;
2. The gel formation step was 12 hours rather than 11 hours;
3. The washing step included one extra 30 minute washing sequence with water.

The following results were obtained:

| Product Collected, lbs. | | 7.1 |
|---|---|---|
| Particle Size Distributions: Cumulative Wt. % on: | | |
| 10 mesh | (>2000 Microns) | 4 |
| 20 mesh | (840 Microns) | 25 |
| 40 mesh | (420 Microns) | 38 |
| 60 mesh | (250 Microns) | 51 |
| 80 mesh | (177 Microns) | 59 |
| 100 mesh | (149 Microns) | 63 |
| 140 mesh | (105 Microns) | 72 |
| 200 mesh | (74 Microns) | 80 |
| 325 mesh | (44 Microns) | 90 |
| −325 mesh | (<44 Microns) | 100 |
| Appearance of Product | | White |
| Appearance of Product after calcination | | White |

The foregoing Examples are presented to illustrate certain embodiments of the present invention and should not be construed in a limiting sense. The scope of protection which is sought is set forth in the claims which follow.

We claim:

1. A process for preparing essentially pure, particulate silica gel which is substantially free of trace contaminants which comprises:
   (a) forming a silica gel composition by the hydrolysis and condensation of a silicon alkoxide in a non-metal lined tumble dryer;

(b) drying the silica gel composition in the tumble dryer;

(c) washing the dried silica gel composition, which is in particulate form, with an aqueous washing solution in the tumble dryer to remove trace contaminants therefrom; and (d) drying the washed, particulate silica gel composition.

2. A process as claimed in claim 1 wherein the silicon alkoxide is ethyl silicate.

3. A process as claimed in claim 1 wherein an acid catalyst is used in formation of the silica gel.

4. A process as claimed in claim 3 wherein an excess of ammonia to the acid catalyst is used to neutralize the acid catalyst.

5. A process as claimed in claim 1 wherein the dried silica gel is washed with water and with aqueous hydrogen peroxide.

6. A process as claimed in claim 1 wherein the silicon alkoxide is ethyl silicate, an acid catalyst is used in formation of the silica gel and is then neutralized with an excess of ammonia to the acid catalyst, and the dried silica gel is washed with water and with aqueous hydrogen peroxide.

* * * * *